US006945586B2

(12) United States Patent
Esteban

(10) Patent No.: US 6,945,586 B2
(45) Date of Patent: Sep. 20, 2005

(54) FLOCKED SUN-VISOR

(75) Inventor: Miguel Angel Sabrido Esteban, Rubi (ES)

(73) Assignee: FICO I.T.M. S.A., Barcelona (ES)

( * ) Notice: Subject to any disclaimer, the term of this patent is extended or adjusted under 35 U.S.C. 154(b) by 0 days.

(21) Appl. No.: 10/221,255

(22) PCT Filed: Mar. 16, 2001

(86) PCT No.: PCT/EP01/03051

§ 371 (c)(1), (2), (4) Date: Jan. 6, 2003

(87) PCT Pub. No.: WO01/68396

PCT Pub. Date: Sep. 20, 2001

(65) Prior Publication Data

US 2003/0168877 A1 Sep. 11, 2003

(30) Foreign Application Priority Data

Mar. 16, 2000 (DE) ........................................ 100 12 846

(51) Int. Cl.[7] .................................................. B60J 3/00
(52) U.S. Cl. ........................................ 296/97.1; 428/90
(58) Field of Search ........................ 296/97.1; 264/233; 156/281, 314; 428/90

(56) References Cited

U.S. PATENT DOCUMENTS 3,547,672 A * 12/1970 Linneborn .................. 427/464
4,721,642 A * 1/1988 Yoshimi et al. ............... 428/90
5,454,616 A * 10/1995 Aymerich et al. .......... 296/97.1
5,964,493 A * 10/1999 Viertel et al. .............. 296/97.1
6,012,757 A * 1/2000 Viertel et al. .............. 296/97.2
6,106,920 A * 8/2000 Pichon et al. ................. 428/90
6,273,489 B1 * 8/2001 Viertel et al. .............. 296/97.9

FOREIGN PATENT DOCUMENTS

DE 2854013 A * 6/1979 ........... B29C/00/00
DE 3004210 A * 9/1980 .............. B60J/3/00
DE 3622263 A * 1/1988 .............. B60J/3/00
FR 2396666 A * 3/1979 ........... B29C/17/07
GB 2010123 A * 6/1979 ............. B32B/5/08

OTHER PUBLICATIONS

Adhesive Materials, Their Properties and Usage, Irving Katz, 1964, Foster Publishing Company, p. 3.*
Adhesive Handbook, J. Shields, 1984, Butterworth & Co (Publishers) Ltd., 3rd edition, pp. 97–103.*
English tranlation of DE 3622263 A (Jan. 1998).*

* cited by examiner

*Primary Examiner*—Patricia L. Engle
(74) *Attorney, Agent, or Firm*—Renner, Otto, Boisselle & Sklar, LLP

(57) ABSTRACT

The present invention provides a flocked sun visor varying in color, constitution, structure, haptics and appearance and a method for its manufacturing. The variable surface coating of the sun visor and the adaptation to the interior fittings of a motor vehicle is achieved by the applied flocks varying in material, shape, structure and color. In the method for manufacturing flocked sun visors, the sun visor body having a hard and smooth surface, preferably a blow molded sun visor body made of plastic, is coated with adhesive and subsequently flocked by using electrostatic effects. In comparison to known methods for manufacturing sun visors having an attractive appearance, the present invention is cheaper and less time-consuming. There are five method steps: Cleaning, priming, adhesive coating, flocking and solidifying.

18 Claims, 2 Drawing Sheets

FLOCKED SUN-VISOR

1. TECHNICAL FIELD

Figure 1:
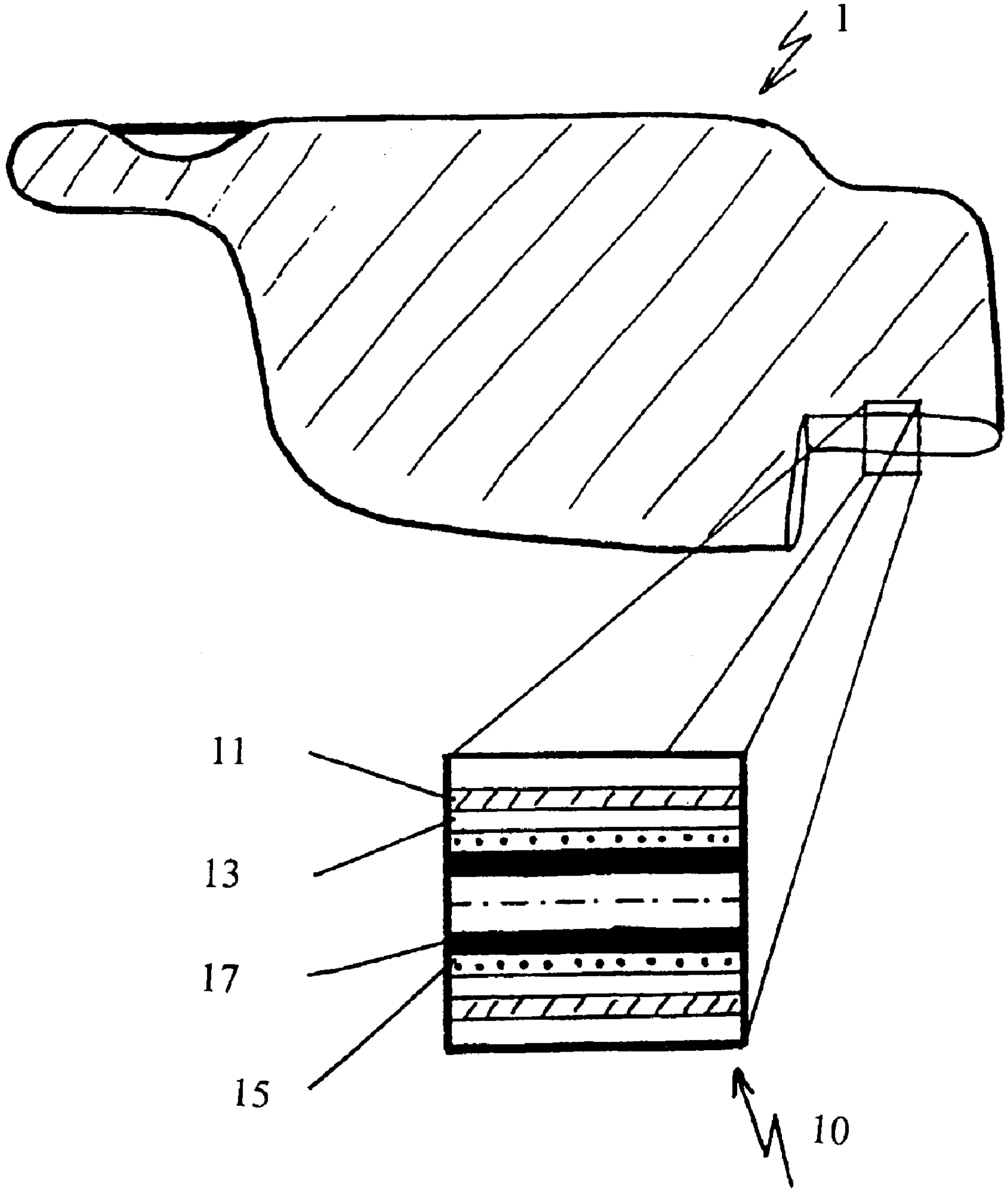

The invention relates to a sun visor for motor vehicles for protecting the head area of the passengers against the incidence of sunlight. Particularly, the present invention relates to a new method for designing optically attractive sun visors.

2. PRIOR ART

Sun visors are plane, elongated bodies having different thicknesses which are moveably mounted on the inside roof lining of motor vehicles. The sun visor can be arranged in such a way that it shades from light shining through the windows and thereby preventing a light dazzlement of the passengers in the motor vehicle.

In the prior art, different methods for producing sun visors are known. First a technical embodiment of sun visors consists of for example an inner wire frame determining the plane shape of the later sun visor. The plane, stable configuration of the sun visor is achieved by a sandwich construction wherein the inner of the wire frame is filled by a reinforcing paper layer and wherein a foamed material layer is respectively adhered to the large-surface sides of said paper layer simultaneously covering the wire frame. Finally, said sandwich structure is for example covered by cloth.

Beside the determination of the shape and the stabilization of the sun visor, the wire frame serves for receiving links in order to mount the sun visor at an appropriate position in the motor vehicle. According to other methods used for a long time, the wire frame is surrounded by a plastic foam. The sun visor produced in this way is then covered by an appropriate material as described above.

Blow molding is a further new method for manufacturing sun visors. To this end, an extruded non-rigid plastic tube is blow molded in a tool using compressed air in a known manner to achieve the desired shape. The plastic sun visors can be designed in their shape by using correspondingly configured tools so that they can receive additional equipment means as for example mirrors or lamps.

In order to improve the appearance of known used plastic sun visors, these known sun visors as already mentioned where covered by appropriate methods. Cloth and plastic covering was particularly used. The covering by plastic layers is generally carried out by means of ultrasonic welding. The used plastic layers typically vary in colour and structure and they can be different on the front and on the back side of the sun visor. While using cloth covers, an appropriate cloth having stocking-like shape which comprises the shape of the sun visor is processed to be subsequently slipped on the sun visor. A clamping apparatus in the blow molded plastic sun visor body receives the open end of the stocking-like cloth cover whereby the sun visor gets a closed cloth cover having a very attractive appearance.

The above described covered plastic sun visors can be only produced with high efforts and thus, they are expensive since the number of the required method steps is considerable and the method steps are partly very complicated. For example, the above described cloth covered sun visors have to be handmade in a considerable extent.

It is therefore the problem of the present invention to provide a sun visor by means of a simple and low cost method which has a high quality appearance, functionality and handling and which meets the most different requirements.

3. SUMMARY OF THE INVENTION

The above and underlying problem of the present invention is solved by a sun visor according to claim 1 and by a method for manufacturing sun visors having a flocked surface according to claim 6.

The surfaces of the advantageously used blow molded sun visor bodies according to the invention can vary in colour, constitution, structure, haptics and appearance. The variable surface coating is achieved by the applied flocks in such a way that they vary in colour, shape, size and structure. The method of manufacturing a flocked sun visor according to the present invention comprises five method steps particularly qualified for the automatic mass manufacturing. The method steps according to the most preferred method comprise the cleaning, the priming, the applying of adhesive coating, the applying of flocks and the solidifying of the coated sun visor body. Therefore, the present method is executed with reduced process-technical and temporal efforts compared to known methods and provides a sun visor which can be designed as desired and corresponding to the requirements.

Preferred embodiments of the invention follow from the dependent claims.

4. SHORT DESCRIPTION OF THE DRAWINGS

Figure 2:
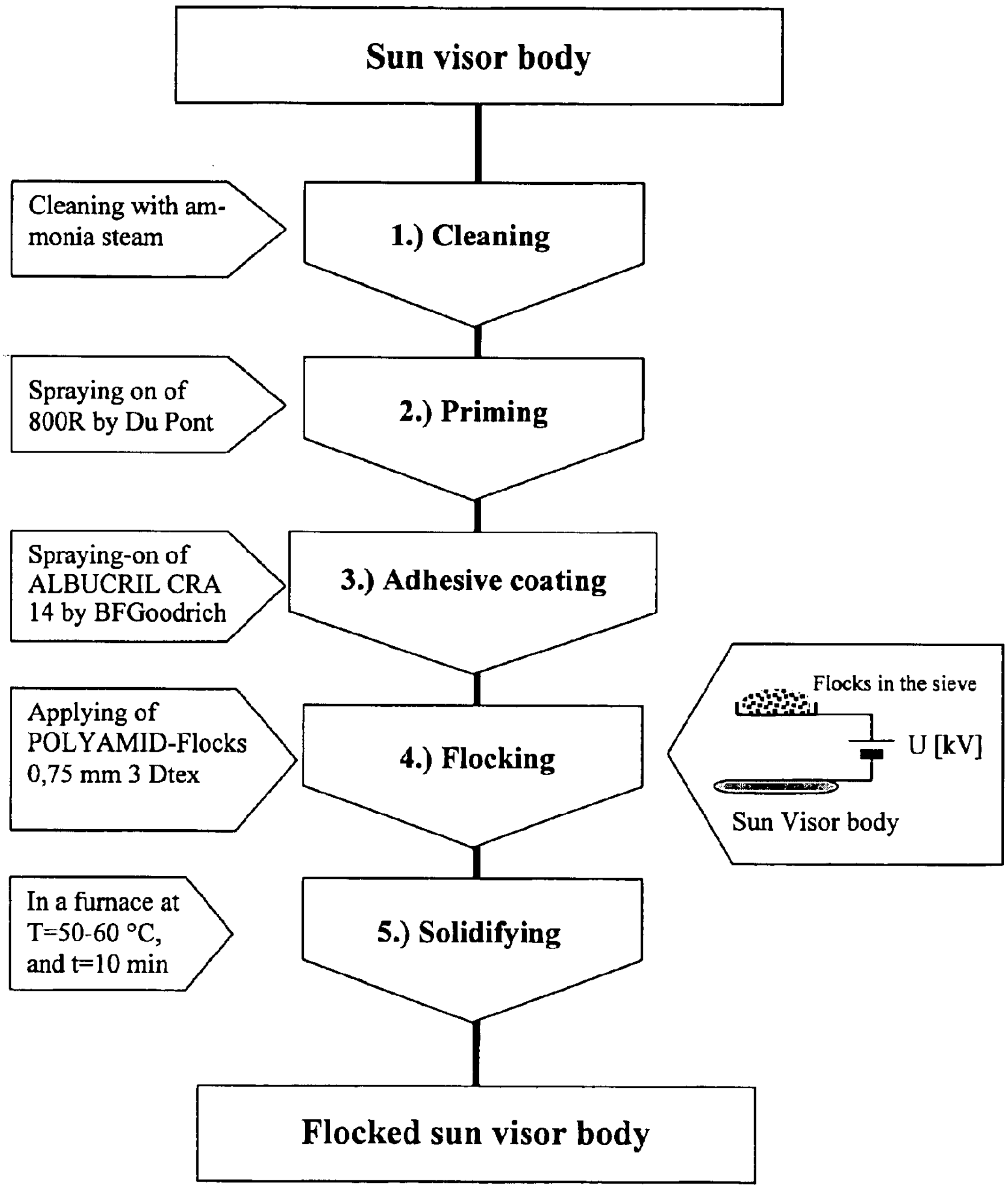

In the following, the presently preferred embodiments of the invention are shortly explained under reference to the drawing. It shows:

FIG. 1 a schematical perspective view of a flocked sun visor wherein the structural configuration of the sun visor is shown by means of a cut enlarged subsection; and FIG. 2 a flowchart for explaining the different method steps according to the invention.

5. DETAILED DESCRIPTION OF THE PREFERRED EMBODIMENTS

In the following, the presently preferred embodiments of the present invention are described in detail under reference to the drawing.

The present invention serves for the provision of the sun visor 1 which is schematically shown in FIG. 1. A schematic enlarged sectional view 10 of the cut open sun visor 1 shows in detail the structural configuration of the sun visor 1 according to a preferred embodiment. The basic structure of the flocked sun visor 1 is preferably formed by a blow molded plastic body 17 which is preferably made of polypropylene. The plastic body 17 is produced by a standard blow molding method and it comprises a smooth, hard surface after its manufacture. However, also other sun visor bodies can be alternatively used as long as the generated surface is only so smooth and hard that the flocking according to the invention (see below) can be applied.

Preferably according to the invention, a primer 15 is applied to the plastic body 17, particularly 800R by the company Du Pont, an adhesion mediator. A further possible primer is made of Cuvertin X8536 of the company Henkel. In comparison to the plastic surface with no primer, the primer 15 generates improved bonding conditions on the smooth and hard surface of the sun visor body 17 for the surface layer to be subsequently applied according to the invention. In case of a preferably adhesive layer 13 (see below) to be applied, said primer 15 protects the plastic body 17 from the plastic solvent dissolver contained in the adhesive 13.

An adhesive coating 13 is preferably on said primer 15 particular ALBUCRIL CRA14 of the company Noveon, an acrylic emulsion, or Flocksil 1506 of the company Henkel. Said adhesive coating 13 serves for fixing the flocks 11 on the outer surface of the flocked sun visor 1. Because of this reason, the adhesive 13 is adapted to the different flock materials and flock structures. First, said adhesive 13 must bond in the right way with said flocks 11 on the basis of its chemical formation and second, said adhesive 13 is only allowed to bind after a certain time since otherwise the flocks 11 to be fixed cannot penetrate in the adhesive 13.

The flocks 11 determine the surface constitution and the appearance of the flocked sun visor 1 according to the invention based on their material, their colour, their shape, their size and structure. Cotton, viscous, nylon, perlon, polyester are different possible flock materials which can be chosen depending on the interior fitting of the motor vehicle in which the flocked sun visor 1 is to be installed. Preferably according to the invention, POLYAMIDE 0.75 mm 3 Dtex is used as flock material.

The method according to the invention of manufacturing a flocked sun visor 1 is now described by means of the flowchart depicted in FIG. 2. A pre-manufactured sun visor body having a hard and smooth surface is the starting point of the method. Preferably, a blow molded plastic body 17 is used. During the preferred blow molding, a plastic tube is blow molded within a lubricated tool. The lubricated inner sides of said tool serve for a better removing of said plastic body 17 from the used tool.

After said blow molding and the removing of the blow molded plastic body 17 from said tool, fat residues are usually on the surface of said plastic body 17. In the first method step according to the invention indicated with "cleaning" in FIG. 2, the fat residues are removed from the surfaces of the plastic body 17. The cleaning is carried out by spraying, dipping, flooding methods or manually in liposoluble cleaners. Said plastic body 17 is particularly cleaned within a cleaning chamber by the application of ammonia steam.

Subsequently in the second method step according to the invention indicated as "priming" in FIG. 2, the plastic body 17 is primed by means of a standard spraying method, as for example spraying using compressed air, wherein 800R of the company Du Pont, an adhesion mediator, is preferably used as a primer. The primer 15 serves for an appropriate basis for the following adhesive coating 13 to be applied and it protects simultaneously the plastic body 17 from the plastic solvent dissolvers contained in the adhesive.

After the drying of the primer 15, an adhesive coating 13 is applied to the primed plastic body 17 in the third method step according to the invention indicated as "adhesive coating" in FIG. 2 by means of a standard spraying method as for example spraying by compressed air wherein ALBUCRIL CRA14 of the company Noveon, an acrylic emulsion, is preferably used. The adhesive 13 varies in its chemical composition dependent on the flocked material to be applied. Additionally, the adhesive 13 is only allowed to bind after a certain time sufficient to apply the flocks on the adhesive coating 13. The advantage of these adhesive properties is explained in method step 4.

The fourth method step indicated with "flocking" in FIG. 2, comprises the application according to the invention of flocks 11, preferably polyamide 0.75 mm 3Dtex, on the adhesive 13 coated surface of the primed plastic body 17. The application of flocks 11 is described by the schematical illustration in the method step 4 of FIG. 2. The flocks 11 to be applied are preferably placed in a sieve to which a high electrical voltage is applied in the range of kilovolt. The adhesive coated plastic body 17 is connected to ground. Based on the electrostatic attraction, the flocks are then attracted by the plastic body 17 and they partly penetrate in the not yet solidified adhesive coating 13 during impact on the adhesive surface. The part of the flocks 11 partly penetrated in the adhesive 13 fixes the respective flock after solidification of the adhesive 13 and it enables in this manner that the flocks 11 cannot be loosened while touching the flocked sun visor.

After flocking the whole surface of the plastic body, the solidification of the adhesive 13 on the plastic body 17 is carried out in the fifth method step according to the invention indicated with "solidifying" in FIG. 2. To this end, the flocked plastic body 17 according to the invention is kept at a certain temperature for a certain time. Dependent on the used materials in the method and the available time during the manufacturing process, the duration and the temperature of the storage is varied. In the method preferred according to the invention, the flocked sun visor 1 is kept 10 minutes at 50 to 60° C.

List of Reference Numbers

| | |
|---|---|
| 1 | Flocked sun visor |
| 10 | Cross-section of the flocked sun visor 1 |
| 11 | Flocks |
| 13 | Adhesive |
| 15 | Primer |
| 17 | Plastic body |

What is claimed is:

1. A sun visor comprising:

a hollow blow molded sun visor body having a hard, smooth exterior surface; and an adhesive coating applied to the hard, smooth exterior surface; and flocks directly fixed to the hard, smooth exterior surface of the sun visor body by the adhesive coating.

2. The sun visor according to claim 1, wherein the hollow blow molded sun visor body is made of polypropylene.

3. The sun visor body according to claim 1, wherein the adhesive coating is made of an acrylic emulsion.

4. The sun visor according to claim 1, wherein the flocks are made of cotton, viscose rayon, polyamide or polyester.

5. The sun visor according to claim 4, wherein the flocks have different colour, shape and structure.

6. The sun visor according to claim 4, wherein the flocks are made of polyamide 0.75 mm 3 Dtex.

7. A method for manufacturing a flocked sun visor, comprising the steps of:

blow molding a hollow sun visor body;

applying an adhesive coating to a hard, smooth exterior surface of the hollow blow molded sun visor body; and electrostatically applying flocks to said adhesive coating of said sun visor body, whereby the flocks are directly fixed to the hard smooth exterior surface by the adhesive coating.

8. The method according to claim 7, wherein the hollow blow molded sun visor body is cleaned after manufacture and before applying the adhesive coating.

9. The method according to claim 8, wherein the hollow blow molded sun visor body is cleaned by means of ammonia.

10. The method according to claim 7, wherein the hollow blow molded sun visor body is primed after the cleaning.

11. The method according to claim 10, wherein the primer is sprayed onto the exterior surface of the sun visor body and later dried.

12. The method according to claim 10, wherein an adhesion mediator is used as a primer.

13. The method according to claim 7, wherein the adhesive coating is applied by spraying.

14. The method of claim 13, wherein an acrylic emulsion is used as the adhesive coating.

15. The method according to claim 7, wherein the flocks are electrostatically applied to the adhesive coating.

16. The method according to claim 15, wherein the flocks are contained in a flock container that comprises a sieve through which the flocks exit the container.

17. The method according to claim 7, wherein the adhesive coating is cured after the flocked coating has been applied.

18. The method according to claim 17, wherein the adhesive coating is cured at a temperature of T=50–60° C. and during a time of t=10 minutes.

* * * * *